(12) United States Patent
Hsu (10) Patent No.: US 11,204,065 B2
(45) Date of Patent: Dec. 21, 2021

(54) ROLLER-TYPE LINEAR GUIDE WITH OIL STORAGE FUNCTION AND OIL STORAGE ACCESSORY THEREOF

(71) Applicant: CHIEFTEK PRECISION CO., LTD., Tainan (TW)

(72) Inventor: Ming-Che Hsu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 0 days.

(21) Appl. No.: 16/907,798

(22) Filed: Jun. 22, 2020

(65) Prior Publication Data

US 2021/0010539 A1  Jan. 14, 2021

(30) Foreign Application Priority Data

Jul. 12, 2019  (TW) .................................. 108124721

(51) Int. Cl.
*F16C 29/06* (2006.01)
*F16C 29/04* (2006.01)
*F16C 33/66* (2006.01)

(52) U.S. Cl.
CPC .......... *F16C 29/0611* (2013.01); *F16C 29/04* (2013.01); *F16C 29/065* (2013.01); *F16C 33/664* (2013.01)

(58) Field of Classification Search
CPC .. F16C 29/04; F16C 29/0611; F16C 29/0635; F16C 29/065; F16C 29/0652; F16C 29/0666; F16C 33/6648; F16C 33/6651; F16C 33/664
See application file for complete search history.

(56) References Cited

U.S. PATENT DOCUMENTS

| | | | | |
|---|---|---|---|---|
| 5,193,914 A | * | 3/1993 | Tanaka | F16C 29/0609 384/44 |
| 7,762,722 B2 | * | 7/2010 | Kuwabara | F16C 33/6611 384/44 |
| 9,394,940 B2 | * | 7/2016 | Takahashi | F16C 33/6681 |
| 2013/0170773 A1 | | 7/2013 | Tsao | |

FOREIGN PATENT DOCUMENTS

| | | |
|---|---|---|
| JP | H1078032 A | 3/1998 |
| JP | 2008151226 A | 7/2008 |
| TW | M256450 U | 2/2005 |
| TW | I285244 B | 8/2007 |

(Continued)

*Primary Examiner* — James Pilkington
(74) *Attorney, Agent, or Firm* — Rosenberg, Klein & Lee (57) ABSTRACT

A roller-type linear guide with an oil storage function and an oil storage accessory thereof are disclosed. The roller-type linear guide includes a rail, a slider unit, a plurality of rollers, and an oil storage member. The slider unit is mounted on the rail to form a circulation passage. The rollers are disposed in the circulation passage to drive the slider unit to reciprocate on the rail. The rollers each have a rolling surface. A non-load passage of the circulation passage has two first inner surfaces facing the rolling surface. The oil storage member is disposed in a concave portion of the first inner surfaces, thereby lubricating the rollers running in the non-load passage. The oil storage accessory is disposed in a through hole of the slider rigid body to form the non-load passage.

14 Claims, 8 Drawing Sheets

(56) References Cited

FOREIGN PATENT DOCUMENTS

| | | |
|---|---|---|
| TW | I325928 B | 6/2010 |
| TW | M437400 U | 9/2012 |
| TW | M491104 U | 12/2014 |
| TW | I500589 B | 9/2015 |
| TW | I616600 B | 3/2018 |

* cited by examiner

ROLLER-TYPE LINEAR GUIDE WITH OIL STORAGE FUNCTION AND OIL STORAGE ACCESSORY THEREOF

FIELD OF THE INVENTION

The present invention relates to a roller-type linear guide with an oil storage function and an oil storage accessory thereof. When rollers are circulated and rolled in a circulation passage of a linear guide, the rollers can be lubricated in a non-load passage and/or a turning passage.

BACKGROUND OF THE INVENTION

A linear guide comprises a rail extending longitudinally and a slider straddling the rail. The circular rolling of rolling elements disposed between the slider and the rail enables the slider to reciprocate on the rail.

Specifically, a load passage is provided between the rail and the slider. The slider has a slider body and two end caps. The two end caps are connected to two ends of the slider body. The slider body provides a non-load passage. The end cap provides a turning passage. The turning passage communicates with the load passage and the non-load passage to form a circulation passage. The rolling elements are circulated and rolled in the circulation passage to drive the slider to run on the rail.

In order to avoid the influence of the frictional resistance between the inner surface of the circulation passage and the surfaces of the rolling elements, resulting in that the rolling elements cannot roll smoothly and the slider vibrates or runs unevenly on the rail, the rolling elements need to be lubricated to reduce the frictional resistance between the rolling elements and the inner surface of the circulation passage.

Please refer to Taiwan Utility Model Publication No. M491104 titled "Linear Guide with Lubricating Structure" and Taiwan Patent No. I325928 titled "Lubricating Device of Linear Guide". In the above-mentioned patents, the end cap is provided with an oil storage member. When the rolling elements pass through the turning passage, the oil storage member can be used to lubricate the rolling elements. However, the turning passage occupies a very short length of the entire circulation passage, so the lubricating oil adhered to the rolling elements is limited, and the lubricating oil may be insufficient. In addition, because the contact surface of the track of the roller type guide is a straight line, only the end surfaces of the rollers are lubricated. It is unable to lubricate the track surfaces of the rollers effectively, resulting in a poor lubrication effect.

Taiwan Patent No. I616600 discloses "a linear guide with a lubricating device". Taiwan Patent No. I500859 discloses "a linear guide with a lubricating system". In the foregoing cases, the oil storage member is arranged above the rail, that is, at the underside of the slider, and the oil storage member is in contact with the rolling elements located in the load passage for lubricating the rolling elements along the whole length of the load passage. However, such a structural configuration requires a space between the rail and the slider for the oil storage member, which is not beneficial for miniaturization of the linear guide.

Taiwan Patent No. I285244 discloses a "linear guide" filed by the inventor of this application. In this patent, a groove is formed in the slider body to accommodate an oil storage block for lubricating the rolling elements. However, after actual use, the inventor found that the oil storage block arranged in this way occupies the interior of the slider rigid body, so the rigidity of the slider rigid body is reduced. Moreover, in this way, the contact area of the oil storage block with the rolling elements is small, so the amount of lubricating oil on the rolling elements is small and the lubrication is insufficient.

SUMMARY OF THE INVENTION

The primary object of the present invention is to provide a roller-type linear guide, comprising: a rail, extending along an axial direction thereof; a slider unit, straddling the rail, the slider unit including a slider rigid body and two end caps, the two end caps being connected to two ends of the slider rigid body, a load passage being formed between the slider rigid body and the rail, the slider rigid body having a non-load passage therein, the two end caps each having a turning passage communicating with the load passage and the non-load passage to form a circulation passage; a plurality of rollers, disposed in the circulation passage to be rolled and circulated for driving the slider unit to reciprocate on the rail; the rollers each having a rolling surface and two non-rolling surfaces, the non-load passage of the slider rigid body having two first inner surfaces facing the rolling surface and two second inner surfaces facing the two non-rolling surfaces, at least one of the first inner surfaces being recessed to form a concave portion corresponding to the rolling surface; an oil storage member, disposed in the concave portion and being in contact with the rollers.

Preferably, the non-load passage is formed in the concave portion and extends along a whole length of the concave portion, and the oil storage member extends along the whole length of the concave portion.

Preferably, the slider rigid body has a through hole extending through the two ends of the slider rigid body. An oil storage accessory is disposed in the through hole to form the non-load passage. The first inner surfaces, the second inner surfaces and the concave portion are formed on the oil storage accessory.

Preferably, the concave portion is a rectangular groove. A plurality of spaced retaining plates are provided in the concave portion and arranged in an interlaced manner. The oil storage member is interlaced with the retaining plates.

Preferably, the concave portion is a dovetail groove or an arc-shaped groove with a curvature greater than 180 degrees.

Preferably, a roller holding chain is provided and configured to connect the rollers in series. Each of the two second inner surfaces of the non-load passage being recessed to form an accommodating groove for accommodating a holding portion of the roller holding chain.

Preferably, an inner surface of the turning passage of at least one of the end caps is provided with the oil storage member, and the oil storage member is in contact with the rolling surfaces of the rollers.

Preferably, two sides of the concave portion each keep a portion of the first inner surface.

Another object of the present invention is to provide an oil storage accessory of a linear guide, mounted in a through hole of a slider rigid body to form a non-load passage in the slider rigid body, the oil storage accessory being elongated and formed with the non-load passage extending through two ends of the oil storage accessory, the non-load passage being in the form of a rectangular groove and having two opposite first inner surfaces and two opposite second inner surfaces, at least one of the first inner surfaces being recessed to form a concave portion.

Preferably, the concave portion is a rectangular groove, and a plurality of spaced retaining plates are arranged in the concave portion in an interlaced manner.

Preferably, the concave portion is a dovetail groove or an arc-shaped groove with a curvature greater than 180 degrees.

Preferably, two sides of the concave portion each keep a portion of the first inner surface.

Preferably, the oil storage accessory is a pipe, and the pipe is composed of two half pipes that are joined.

According to the above technical features, the following effects can be achieved:

1. The rollers can be lubricated by the oil storage member along the whole length of the non-load passage to ensure the stability of the circular rolling of the rollers.

2. The oil storage member is disposed in the non-load passage, which does not increase the volume of the slider unit and is beneficial for the miniaturization of the linear guide.

3. When the concave portion is a rectangular groove, the interlaced retaining plates are arranged in an interlaced manner, and the oil storage member is interlaced with the retaining plates, so that the oil storage member is retained in the concave portion of the first inner surface of the non-load passage stably. Alternatively, the concave portion is directly set as a dovetail groove or an arc-shaped groove, so that the oil storage member can be directly confined in the concave portion.

4. In addition to providing the oil storage member in the non-load passage, the oil storage member may be provided on the inner surface of the turning passage to improve the lubrication effect on the rollers.

5. The oil storage member of the present invention is arranged on the oil storage accessory, not occupying the volume of the slider rigid body, so it will not affect the rigidity of the slider rigid body.

6. The oil storage member of the present invention is in contact with the respective two sides of the rollers, so the contact area with the rollers is larger. The lubricating oil can be fully adhered to the rollers, and the lubrication effect is better.

DETAILED DESCRIPTION OF THE PREFERRED EMBODIMENTS

Embodiments of the present invention will now be described, by way of example only, with reference to the accompanying drawings.

Figure 1:
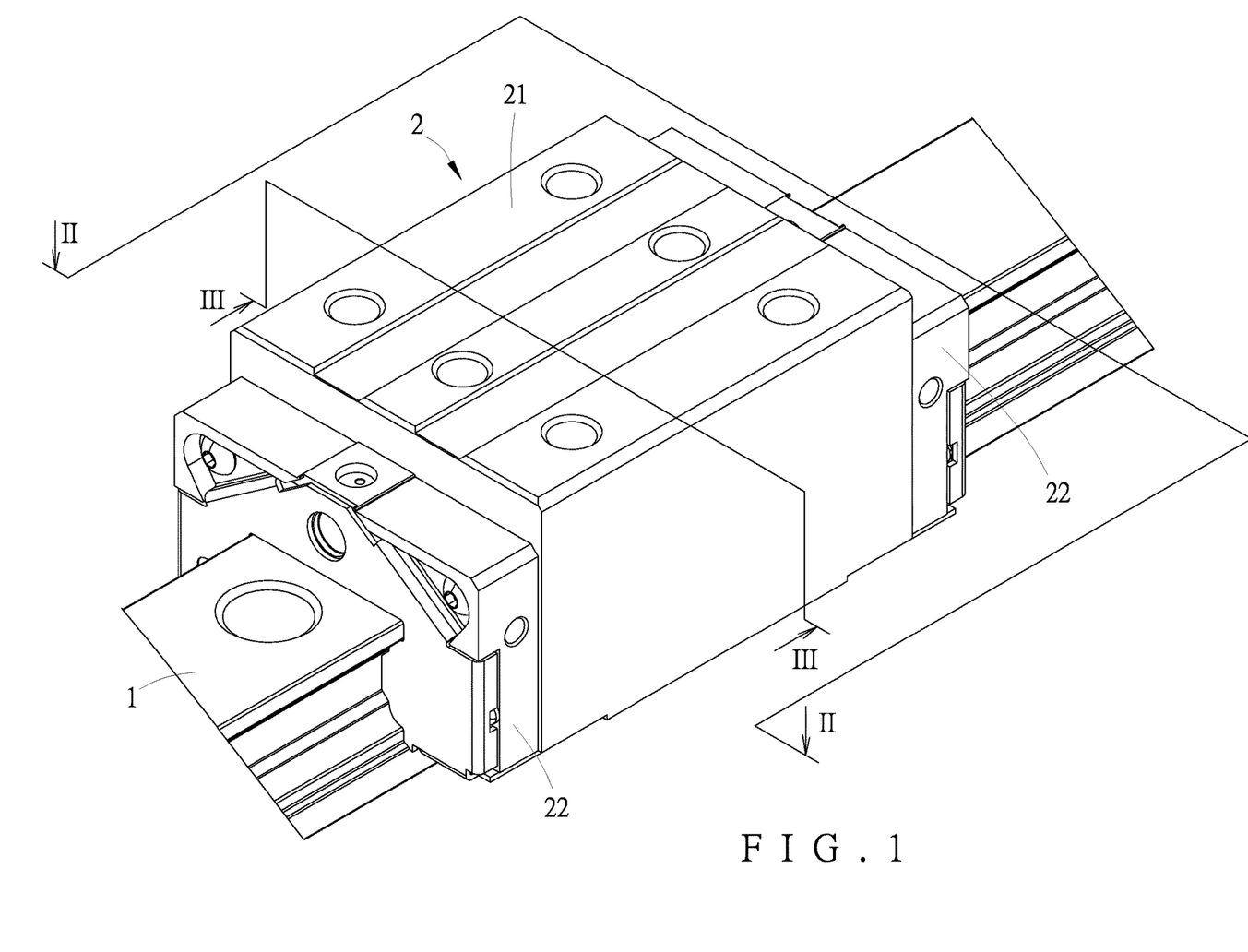
FIG. 1 is a perspective view of the roller-type linear guide of the present invention.
Figure 2:
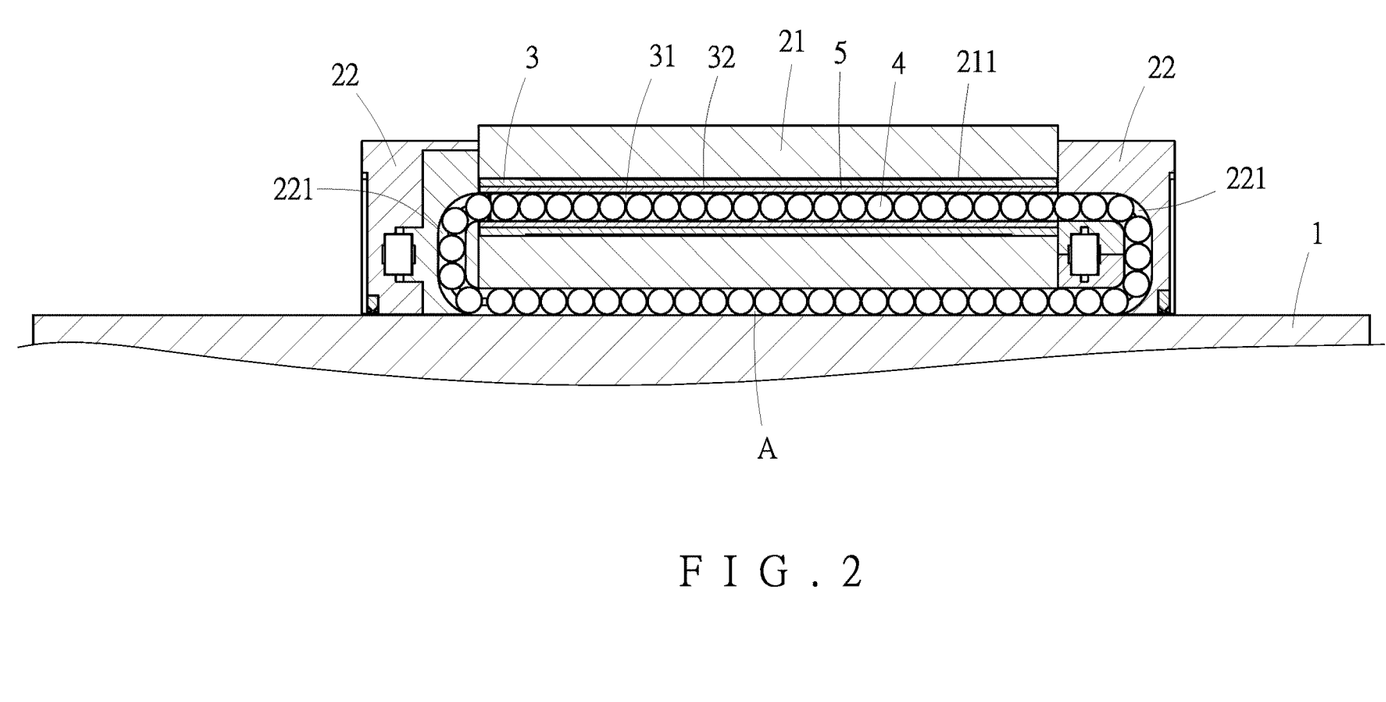
FIG. 2 is a cross-sectional view of FIG. 1.
Figure 3:
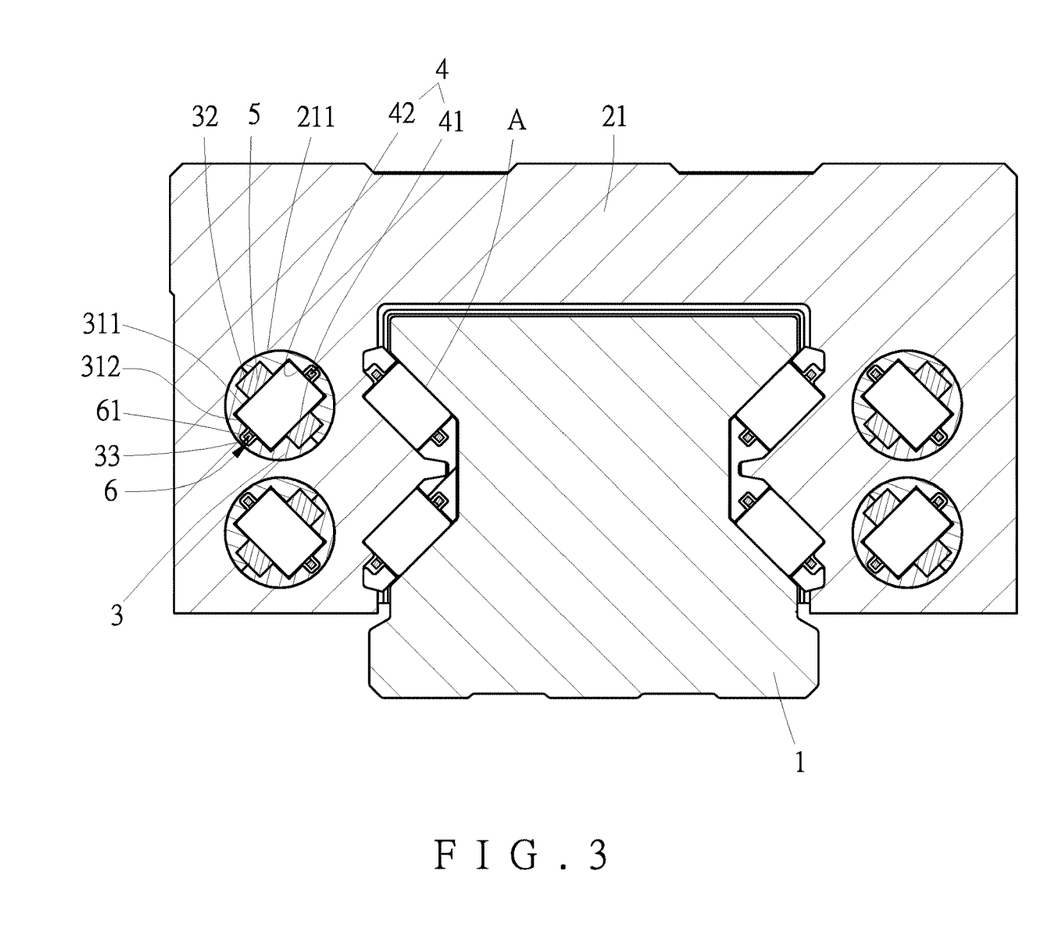
FIG. 3 is another cross-sectional view of FIG. 1.
Figure 3A:
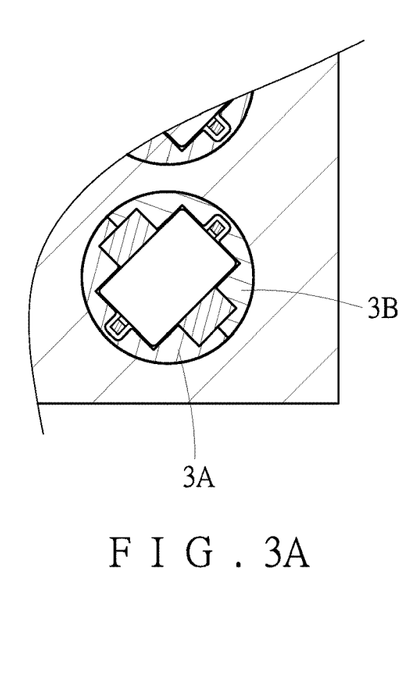
FIG. 3A is a partially enlarged view of FIG. 3.

As shown in FIGS. 1 to 3, the present invention discloses a roller-type linear guide with an oil storage function and an oil storage accessory thereof. The roller-type linear guide comprises a rail (1), a slider unit (2), an oil storage accessory (3), a plurality of rollers (4), an oil storage member (5), and a roller holding chain (6). The rail (1) extends along an axial direction thereof. The slider unit (2) straddles the rail (1). The slider unit (2) includes a slider rigid body (21) and two end caps (22). The two end caps (22) are connected to two ends of the slider rigid body (21). A load passage (A) is formed between the slider rigid body (21) and the rail (1). The slider rigid body (21) has a through hole (211) extending through the two ends of the slider rigid body (21). The oil storage accessory (3) is disposed in the through hole (211). The oil storage accessory (3) is elongated and has a non-load passage (31) extending through two ends of the oil storage accessory (3). For easy production, the oil storage accessory (3) in this embodiment is a pipe, and is composed of two half pipes (3A) and (3B) that are joined (as shown in FIG. 3A). Each end cap (22) has a turning passage (221) communicating with the load passage (A) and the non-load passage (31) to form a circulation passage. The rollers (4) are placed in the circulation passage to be rolled and circulated for driving the slider unit (2) to reciprocate on the rail (1). The rollers (4) each have a rolling surface (41) and two non-rolling surfaces (42). The non-load passage (31) has two first inner surfaces (311) facing the rolling surface (41) and two second inner surfaces (312) facing the two non-rolling surfaces (42). At least one of the first inner surfaces (311) is recessed to form a concave portion corresponding to the rolling surface (41). Two sides of the concave portion each keep a portion of the first inner surface (311), so that the two sides of the concave portion are in contact with the rollers (4), thereby ensuring the rolling stability of the rollers (4). The concave portion is, for example, a rectangular groove (32). In this embodiment, the rectangular groove (32) is concavely formed on the two first inner surfaces (311). Furthermore, the rectangular groove (32) is formed along the whole length of the non-load passage (31). The oil storage member (5) is disposed along the whole length of the rectangular groove (32) and is in contact with the rollers (4). The roller holding chain (6) is configured to connect the rollers (4) in series. Each of the two second inner surfaces (312) of the non-load passage (31) is recessed to form an accommodating groove (33). The roller holding chain (6) has a holding portion (61) accommodated in the accommodating groove (33).

Through the circular rolling of the rollers (4) in the circulation passage, the slider unit (2) can run on the rail (1). When the rollers (4) enters the non-load passage (31), the rolling surfaces (41) of the rollers (4) can be lubricated by the oil storage member (5) along the whole length of the non-load passage (31) to ensure the stability of the circular rolling of the rollers (4). The oil storage member (5) is disposed in the non-load passage (31), which does not increase the volume of the slider unit (2) and is beneficial for the miniaturization of the linear guide. Besides, the oil storage member (5) is arranged on the oil storage accessory (3), not occupying the volume of the slider rigid body (21), so it will not affect the rigidity of the slider rigid body (21). The oil storage member (5) is in contact with the respective two sides of the rollers (4), so the contact area with the rollers (4) is larger and the lubrication effect is better.

Figure 4:
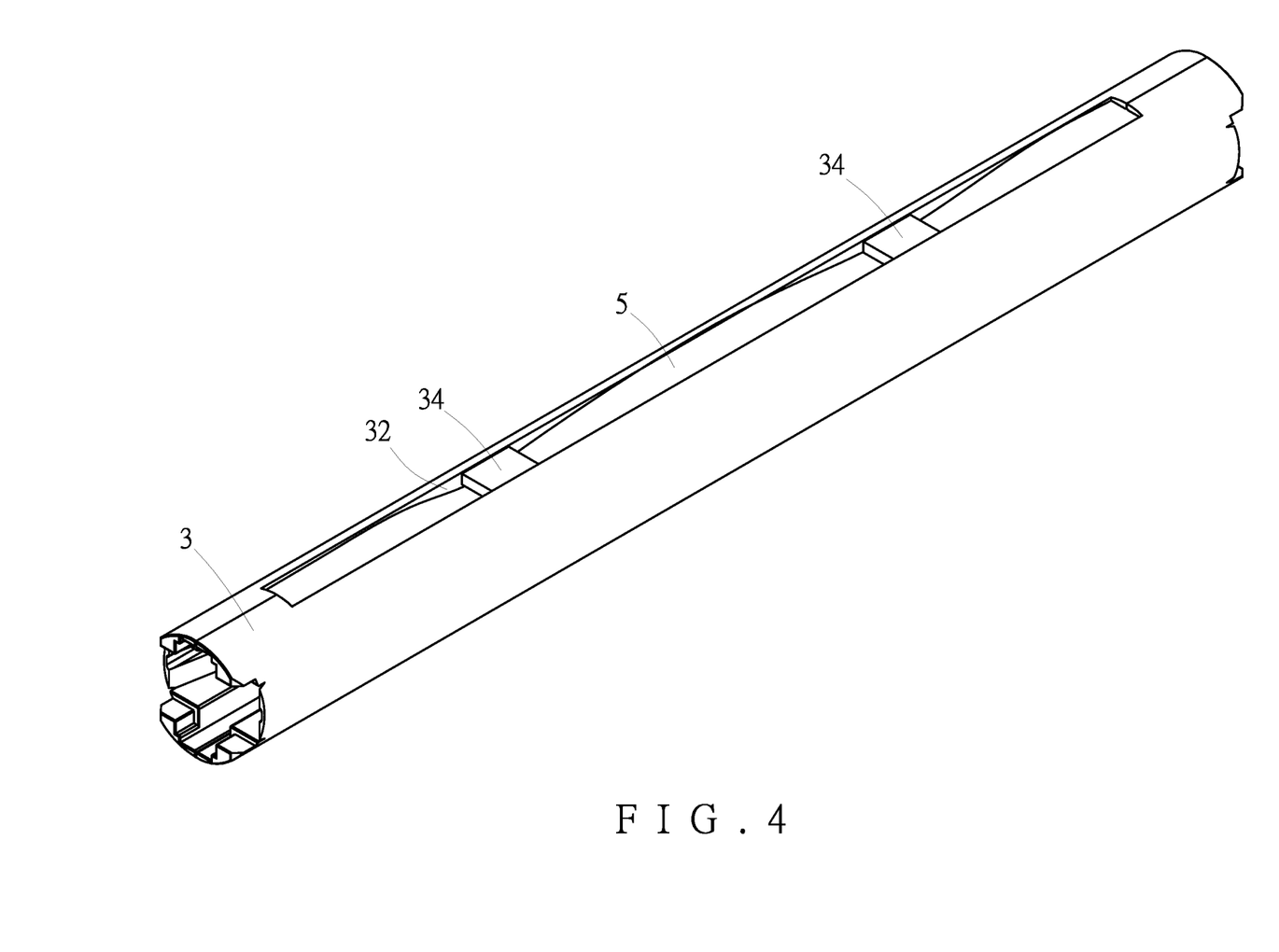
FIG. 4 is a perspective view of the oil storage accessory of the present invention.
Figure 5:
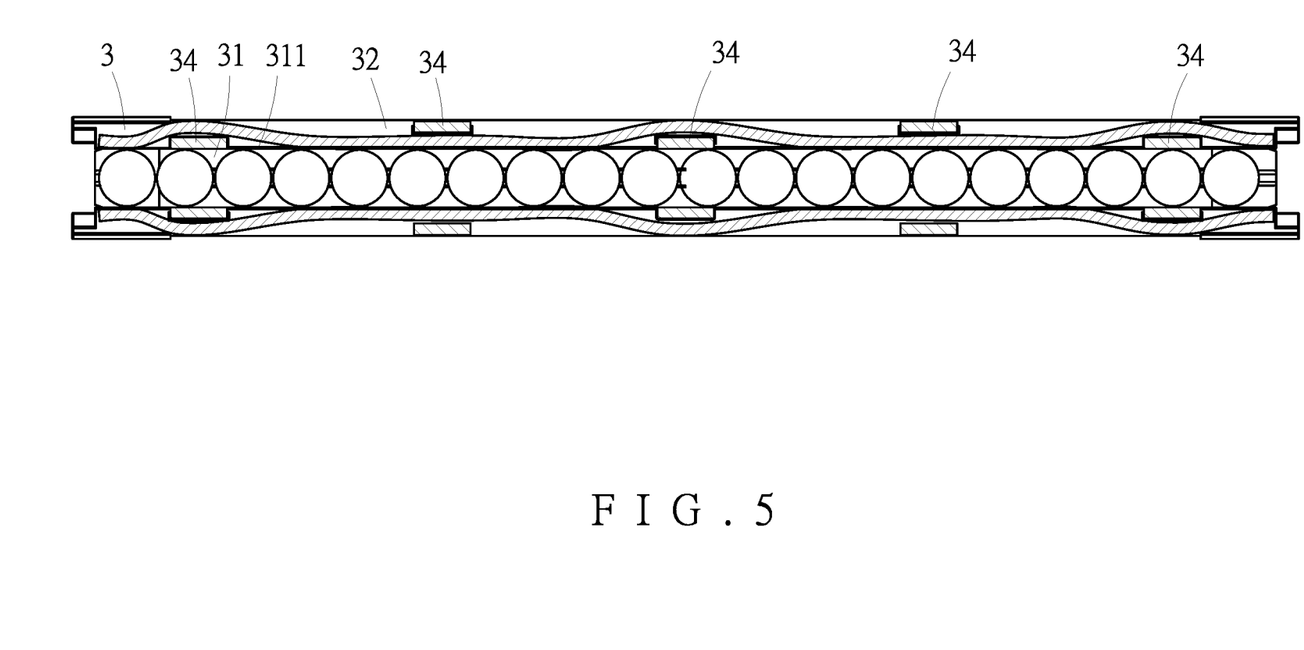
FIG. 5 is a schematic view according to an embodiment of the present invention, wherein the concave portion is a rectangular groove, and the oil storage member is accommodated in the concave portion of the first inner surface of the non-load passage and is interlaced with the retaining plates.

Referring to FIG. 3 through FIG. 5, the concave portion is a rectangular groove (32), and a plurality of spaced retaining plates (34) are provided in the rectangular groove (32) and arranged in an interlaced manner. The oil storage member (5) is interlaced with the retaining plates (34), so that the oil storage member (5) is retained in the rectangular groove (32) of the first inner surface (311) of the non-load passage (31) stably, preventing the oil storage member (5) from coming out of the rectangular groove (32).

Figure 6:
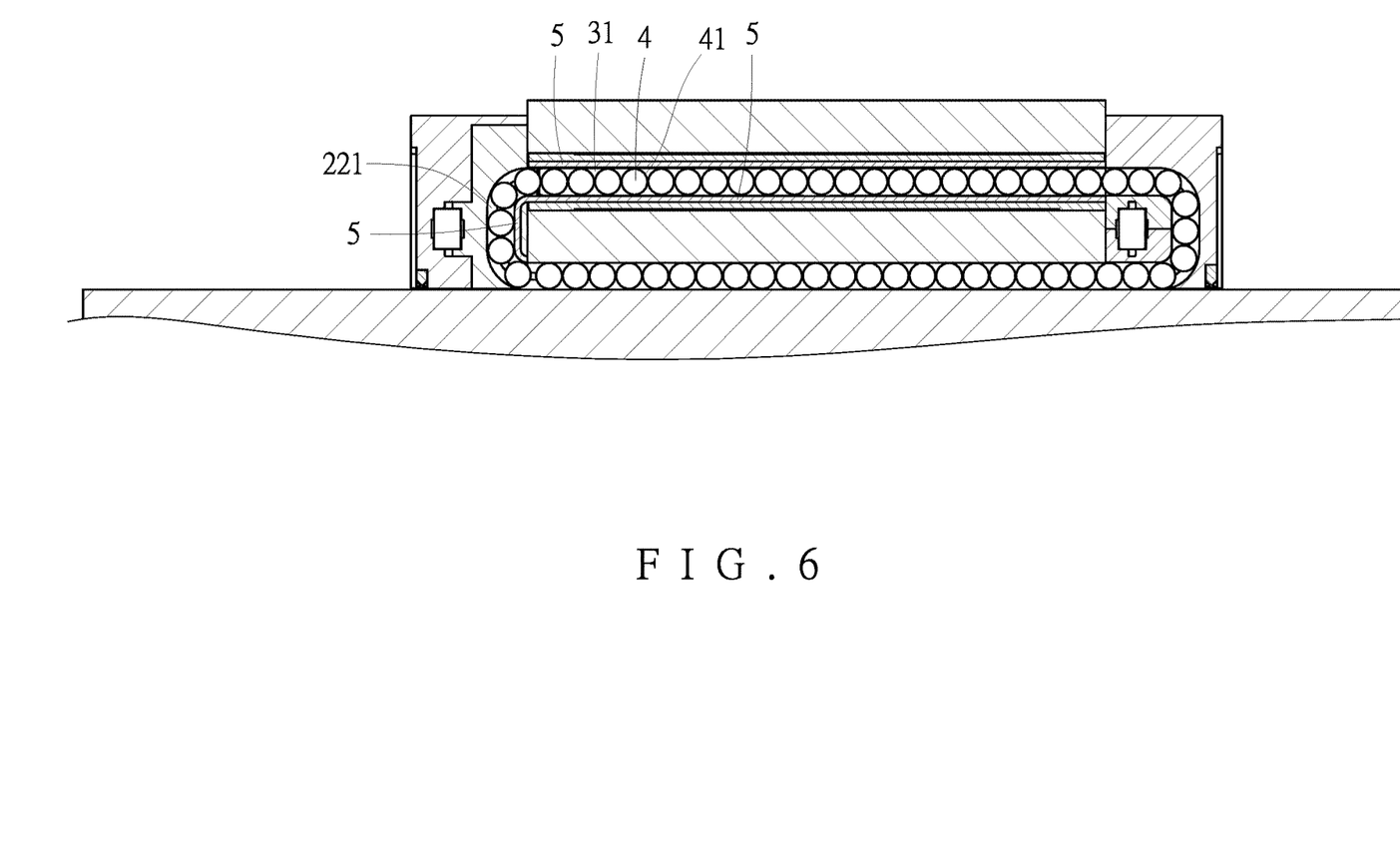
FIG. 6 is a schematic view according to an embodiment of the present invention, wherein the inner surface of the turning passage is also provided with the oil storage member.

Referring to FIG. 6, in addition to providing the oil storage member (5) in the non-load passage (31), the oil storage member (5) may be provided on the inner surface of the turning passage (221), and the oil storage member (5) is in contact with the rolling surfaces (41) of the rollers (4). Therefore, in addition to being lubricated in the non-load passage (31), the rollers (4) can also be lubricated in the turning passage (221), thereby improving the lubrication effect on the rollers (4).

Figure 7:
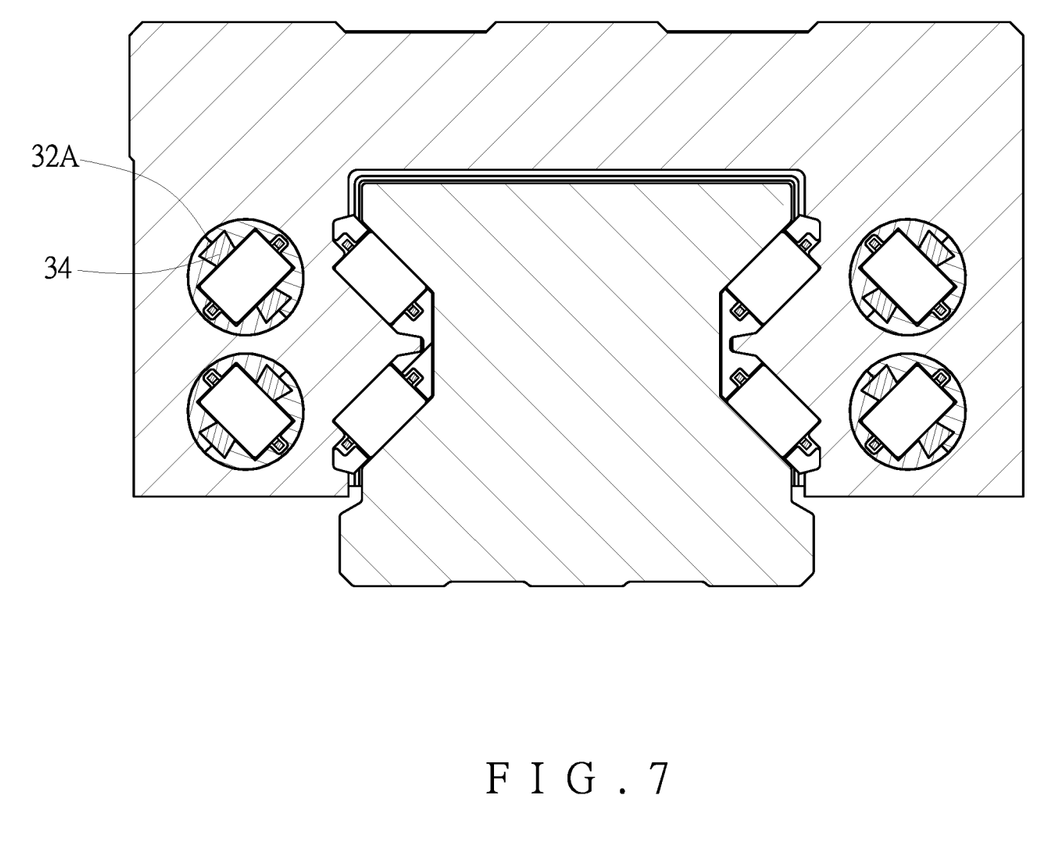
FIG. 7 is a schematic view according to an embodiment of the present invention, wherein the concave portion is a dovetail groove and the oil storage member is confined in the concave portion.

As shown in FIG. 7, the concave portion may be a dovetail groove (32A). The narrow opening of the dovetail groove (32A) can prevent the oil storage member (5) from coming out of the dovetail groove (32A).

Figure 8:
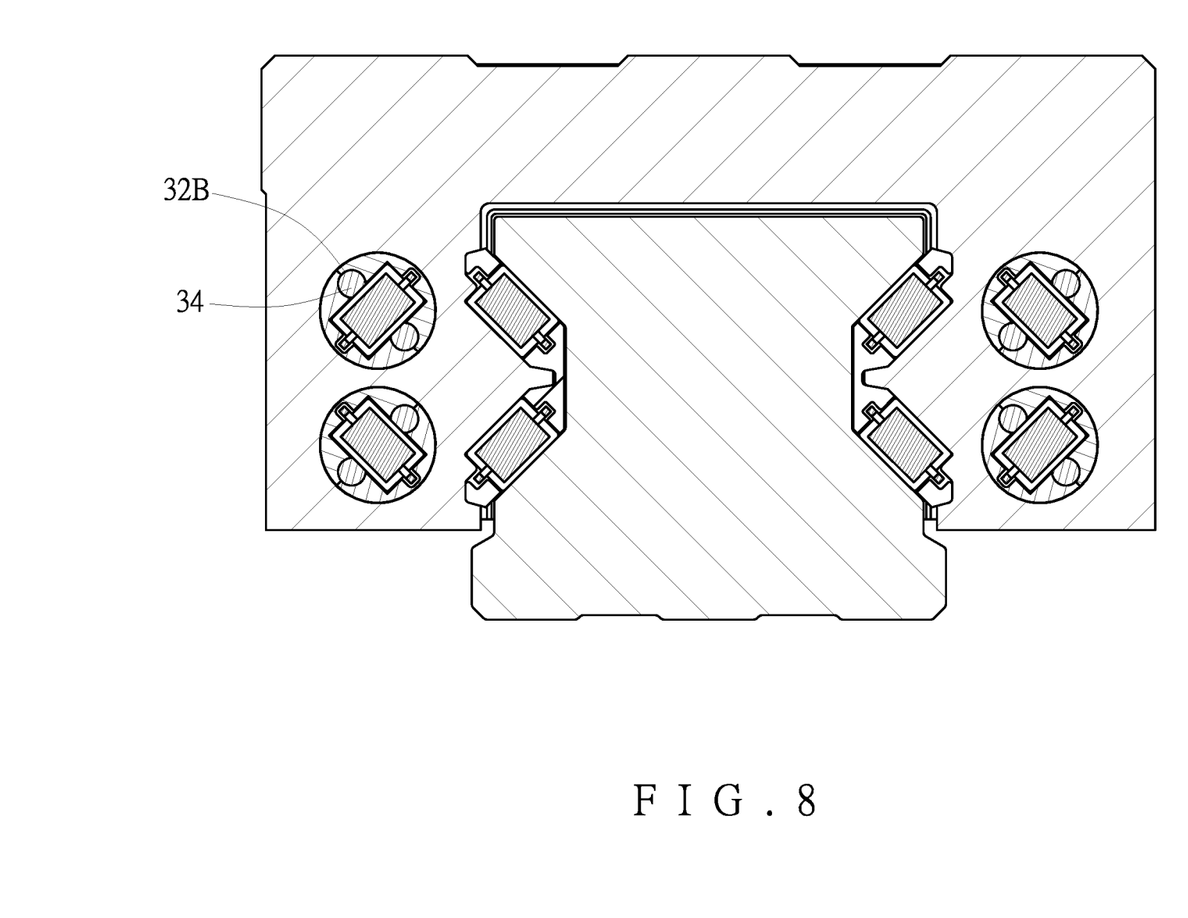
FIG. 8 is a schematic view according to an embodiment of the present invention, wherein the concave portion is an arc-shaped groove and the oil storage member is confined in the concave portion.

As shown in FIG. 8, the concave portion may be an arc-shaped groove (32B) with a curvature greater than 180 degrees. The narrow opening of the arc-shaped groove (32B) can prevent the oil storage member (5) from coming out of the arc-shaped groove (32B).

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A roller-type linear guide, comprising:
    a rail, extending along an axial direction thereof;
    a slider unit, straddling the rail so that a load passage is formed between the slider unit and the rail, the slider unit including a slider rigid body and two end caps, the two end caps being connected to two ends of the slider rigid body, the slider rigid body having a non-load passage therein, the two end caps each having a turning passage communicating with the load passage and the non-load passage to form a circulation passage;
    a plurality of rollers, disposed in the circulation passage to be rolled and circulated for driving the slider unit to reciprocate on the rail; the rollers each having a rolling surface and two non-rolling surfaces, the non-load passage of the slider rigid body having two first inner surfaces facing the rolling surface and two second inner surfaces facing the two non-rolling surfaces, at least one of the first inner surfaces including a recess forming a concave portion corresponding to the rolling surface, each of the two second inner surfaces of the non-load passage including a recess forming an accommodating groove;
    a roller holding chain, configured to connect the rollers in series, the roller holding chain having a holding portion accommodated in the accommodating groove; and
    an oil storage member, disposed in the concave portion and being in contact with the rollers.

2. The roller-type linear guide as claimed in claim 1, wherein the concave portion extends along a whole length of the non-load passage, and the oil storage member extends along the whole length of the concave portion.

3. The roller-type linear guide as claimed in claim 1, wherein the slider rigid body has a through hole extending through the two ends of the slider rigid body, an oil storage accessory is disposed in the through hole to form the non-load passage, the first inner surfaces, the second inner surfaces and the concave portion are formed on the oil storage accessory.

4. The roller-type linear guide as claimed in claim 1, wherein the concave portion is a rectangular groove, and a plurality of spaced retaining plates are provided in the concave portion, the oil storage member is interlaced with the retaining plates.

5. The roller-type linear guide as claimed in claim 1, wherein the concave portion is a dovetail groove.

6. The roller-type linear guide as claimed in claim 1, wherein the concave portion is an arc-shaped groove with a curvature greater than 180 degrees.

7. The roller-type linear guide as claimed in claim 1, an inner surface of the turning passage of at least one of the end caps is provided with the oil storage member, and the oil storage member is in contact with the rolling surfaces of the rollers.

8. The roller-type linear guide as claimed in claim 1, wherein the concave portion is centrally located in the first inner surface.

9. An oil storage accessory of a linear guide, mounted in a through hole of a slider rigid body, the oil storage accessory comprising:
    a non-load passage, the non-load passage being in the form of a first rectangular groove and having two opposite first inner surfaces and two opposite second inner surfaces, at least one of the first inner surfaces including a recess forming a second rectangular groove, each of the two second inner surfaces of the non-load passage including a recess forming an accommodating groove; and
    an oil storage member retained in the second rectangular groove and being in contact with rollers.

10. The oil storage accessory of the linear guide, as claimed in claim 9, wherein the oil storage accessory is provided with a plurality of spaced retaining plates arranged in the concave portion.

11. The oil storage accessory of the linear guide, as claimed in claim 9, wherein the second rectangular groove is a dovetail groove.

12. The oil storage accessory of the linear guide, as claimed in claim 9, wherein the second rectangular groove is an arc-shaped groove with a curvature greater than 180 degrees.

13. The oil storage accessory of the linear guide, as claimed in claim 9, wherein the oil storage accessory is a pipe, and the pipe is composed of two half pipes that are joined.

14. The oil storage accessory of the linear guide, as claimed in claim 9, wherein the second rectangular groove is centrally located in the first inner surface.

* * * * *